US008176438B2

(12) United States Patent
Zaman et al.

(10) Patent No.: US 8,176,438 B2
(45) Date of Patent: May 8, 2012

(54) MULTI-MODAL INTERACTION FOR A SCREEN MAGNIFIER

(75) Inventors: Nazia Zaman, Bellevue, WA (US); Paul J. Reid, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 738 days.

(21) Appl. No.: 12/238,464

(22) Filed: Sep. 26, 2008

(65) Prior Publication Data

US 2010/0079498 A1 Apr. 1, 2010

(51) Int. Cl.
*G06F 3/048* (2006.01)
(52) U.S. Cl. ........ 715/815; 715/800; 715/801; 715/786; 715/863; 715/857
(58) Field of Classification Search .................. 715/862, 715/863, 815, 800, 801, 786, 857; 345/661
See application file for complete search history.

(56) References Cited

U.S. PATENT DOCUMENTS

| | | | |
|---|---|---|---|
| 6,118,888 A | 9/2000 | Chino et al. | |
| 6,946,672 B1* | 9/2005 | Lapstun et al. | 250/566 |
| 7,216,034 B2 | 5/2007 | Vitikainen et al. | |
| 2003/0214519 A1* | 11/2003 | Smith et al. | 345/660 |
| 2004/0172191 A1* | 9/2004 | Vitikainen et al. | 701/208 |
| 2005/0001815 A1* | 1/2005 | Tsunoda | 345/158 |
| 2005/0288934 A1 | 12/2005 | Omi | |
| 2006/0022955 A1* | 2/2006 | Kennedy | 345/173 |
| 2006/0026521 A1 | 2/2006 | Hotelling et al. | |
| 2006/0026535 A1* | 2/2006 | Hotelling et al. | 715/863 |
| 2006/0149550 A1 | 7/2006 | Salminen | |
| 2007/0013722 A1* | 1/2007 | Souza | 345/660 |
| 2007/0124507 A1 | 5/2007 | Gurram et al. | |
| 2007/0257891 A1 | 11/2007 | Esenther et al. | |
| 2008/0062202 A1* | 3/2008 | Schulz et al. | 345/665 |
| 2008/0065386 A1 | 3/2008 | Cross et al. | |
| 2008/0082909 A1* | 4/2008 | Zuverink et al. | 715/224 |
| 2008/0165161 A1* | 7/2008 | Platzer et al. | 345/177 |
| 2008/0165210 A1* | 7/2008 | Platzer et al. | 345/672 |
| 2008/0168402 A1* | 7/2008 | Blumenberg | 715/863 |
| 2009/0241059 A1* | 9/2009 | Moore et al. | 715/800 |

OTHER PUBLICATIONS

Spillers, Frank, "Multi-Modal Design: Gesture, Touch and Mobile Devices . . . Next Big Thing?", Retrieved at<<http://experiencedynamics.blogs.com/site_search_usability/2007/06/multimodal_desi.html>>, Jun. 5, 2007, pp. 3.
Larson, et al., "W3C Multimodal Interaction Framework", Retrieved at<<http://www.w3.org/TR/mmi-framework/>>, W3C Note, May 6, 2003, pp. 1-23.

(Continued)

*Primary Examiner* — Tadeese Hailu
(74) *Attorney, Agent, or Firm* — Boswell IP Law; J. Mason Boswell (57) ABSTRACT

A multi-model magnification system is described that can be used with multiple forms of input, including natural input such as touch-based devices. Users can zoom in/out and pan with their preferred mode of interaction, including mouse, keyboard, pen, and touch interactions. The system provides dedicated features for some modes, such as pinch/scroll gestures for touch input, that allow users to easily zoom in/out and pan the magnified area (e.g., on a touch laptop). The system provides an interactive panning mode in which the user the user can interact with the desktop or applications (e.g., clicking on icons) and pan using special gestures. When the system is in the panning mode, the system consumes received gestures or other input, otherwise the system passes received input to a magnified application.

20 Claims, 6 Drawing Sheets

OTHER PUBLICATIONS

Gorostiza, et al., "Multimodal Human-Robot Interaction Framework for a Personal Robot", Retrieved at<<http://66.102.1.104/scholar?hl=en&lr=&q=cache:p559-X4mbqYJ:roboticslab.uc3m.es/publications/2006%2520RO-Man%2520Javi.pdf+>>, pp. 1-7.

Milekic, Slavko, "Interactive Surfaces for Knowledge Dissemination", Retrieved at<<http://www.ichim.org/ichim04/contenu/SARLE/Gesture%20Gallery/interactiveSurfacesICHIMI.doc>>, Nov. 3, 2003, pp. 10.

* cited by examiner

MULTI-MODAL INTERACTION FOR A SCREEN MAGNIFIER

BACKGROUND

Screen magnifiers are a type of assistive technology used by visually impaired people with some functional vision. By magnifying areas of the screen, the screen magnifier allows people that would otherwise not be able to see areas of the screen that are too small to enlarge these areas. Screen magnifiers are software applications that present a computer's graphical output in an enlarged form. Many screen magnifiers act similar to a physical magnifying glass that a user can move around over the screen to magnify a specific area, except rather than a physical object the screen magnifier is software and the user moves the displayed glass or lens with the mouse or other input device. The most common method of magnification is to present an enlarged view of a portion of the original screen content that covers a portion of or the entire screen. The enlarged view often tracks the pointer or cursor as the user moves a mouse or other input device around the screen so that the user can magnify different areas. Screen magnifiers may work with a single application or across multiple applications at the operating system level. For example, Microsoft Windows Vista includes Magnifier, an application for magnifying the entire desktop and any applications displayed on it.

Because the view is enlarged, screen magnifiers provide a way to move the lens, or magnified area, to different areas of the desktop or application. For example, at a magnification factor of 4 times (4×), only one-eighth of the desktop can be shown in a full screen magnifier at a time. Thus, to see the other three-fourths of the desktop a user moves the magnified area around in a process called panning. Although panning often refers only to horizontal movement (and scrolling or other terms refer to vertical movement), panning and movement as used herein refer to movement of the magnified view in any direction, whether horizontally, vertically, or diagonally.

A tablet PC, or pen computer, is a notebook or slate-shaped mobile computer, equipped with a touch screen or graphics tablet/screen hybrid technology that allows the user to operate the computer with a stylus, digital pen, or fingertip instead of a keyboard or mouse. Tablet PCs offer a more natural form of input, as sketching and handwriting are a much more familiar form of input than a keyboard and mouse, especially for people who are new to computers. Tablet PCs can also be more accessible because those who are physically unable to type can utilize the additional features of a tablet PC to be able to interact with the electronic world. Applications often do not know they are running on a tablet PC, and the operating system may attempt to provide input to applications that appears similar to mouse input. This can cause several problems for screen magnifiers used in conjunction with tablet PCs or other touch-based interface devices.

One problem is that most screen magnifiers do not handle touch or other natural input in any special way. For example, the screen magnifier may receive notifications from the operating system about natural input operations that are similar to mouse input (e.g., click, hover, move left). This means that at best, the natural input functions on par with previous forms of input with the screen magnifier, and possibly introduces new and awkward difficulties with interacting with the screen magnifier. For example, unlike a mouse touch-based interface devices may not distinguish between setting the pen down to move it (e.g., panning a magnification area) and tapping the screen to click an object (e.g., selecting an icon).

To resolve this ambiguity, some applications have an exclusive panning mode (e.g., often represented by a hand icon) that informs the application to interpret movements of the pen or other device as panning movements, when selected. In this mode, the application locks the display area to the cursor position and moves the display area as the user moves the cursor to perform panning. However, this type of panning mode prevents the user from performing activities other than panning, such as clicking on or interacting with user interface elements, until the user leaves the exclusive panning mode. In addition, applications that are magnified often are designed to provide special benefits to touch-based users, such as pen gestures that the user can make to perform special functions. It is ambiguous when a user makes one of these gestures in the screen magnifier whether the user is intending to interact with the application or the screen magnifier.

SUMMARY

A multi-model magnification system is described that can be used with multiple forms of input, including natural input such as touch-based devices. Users can zoom in/out and pan with their preferred mode of interaction, including mouse, keyboard, pen, and touch interactions. The system provides dedicated features for some modes, such as pinch/scroll gestures for touch input, that allow users to easily zoom in/out and pan the magnified area (e.g., on a touch laptop). The user can pan the magnified desktop in a manner similar to traditional panning. The user can scroll the desktop by dragging the visible surface using the stylus or mouse. The system provides an interactive panning mode in which the user the user can interact with the desktop or applications (e.g., clicking on icons) and pan using special gestures. When the system is in the panning mode, the system consumes received gestures or other input, otherwise the system passes received input to a magnified application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A multi-model magnification system is described that can be used with multiple forms of input, including natural input such as touch-based devices. Users can zoom in/out and pan with their preferred mode of interaction, including mouse, keyboard, pen, and touch interactions. The system provides dedicated features for some modes, such as pinch/scroll gestures with touch that allow users to easily zoom in/out and pan the magnified area (e.g., on a touch laptop). The user can pan the magnified desktop in a manner similar to traditional panning. The user can scroll the desktop by simply dragging the visible surface using the stylus or mouse. When the user touches the stylus to the screen and drags the pen, or clicks the mouse button and drags the mouse, or touches the screen and drags the finger, the system scrolls the desktop by the amount the cursor moves. In some embodiments, the system provides an interactive panning mode in which the user the user can interact with the desktop or applications (e.g., clicking on icons) and modify behavior of the magnification system using special gestures. The user can drag the desktop vertically, horizontally, or in a varied diagonal fashion if there is content to scroll to in that direction. By grabbing and dragging up, the desktop moves up (similar to scrolling down). By grabbing and dragging down, the desktop moves down and the contents at the top are visible (similar to scrolling up). This works similarly for horizontal and diagonal panning. Pinch gestures work for zoom in/out, and double finger panning works for panning the magnified contents.

Figure 1:
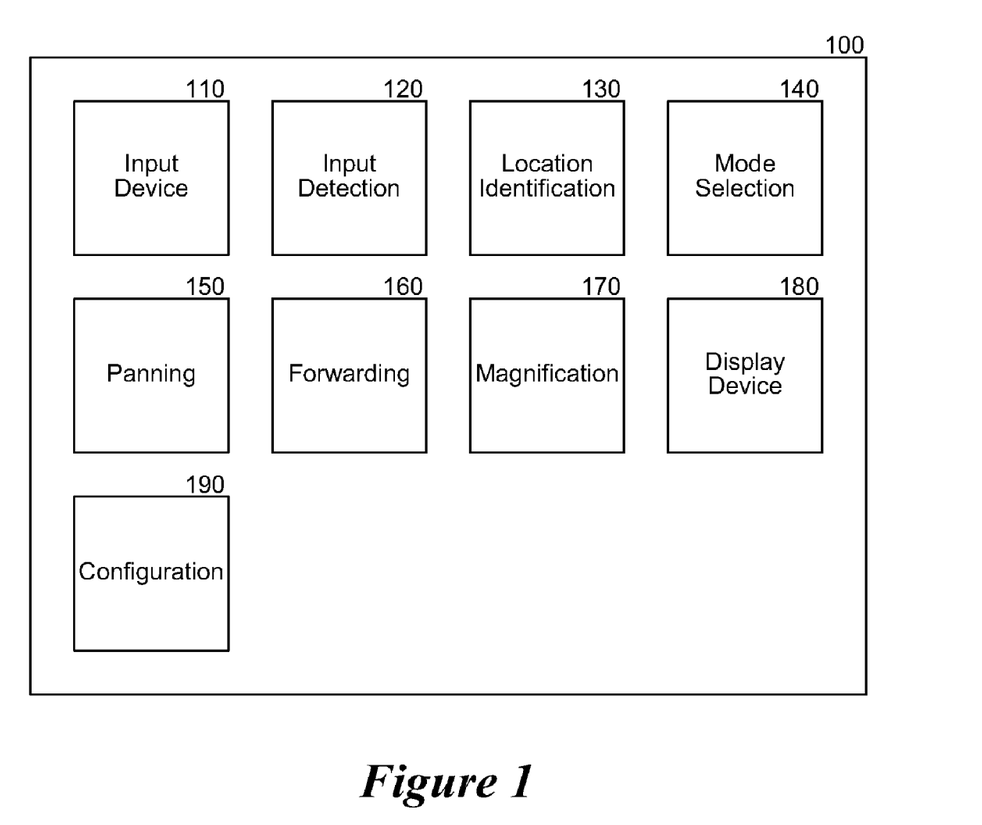
FIG. 1 is a block diagram that illustrates the components of the multi-modal magnification system, in one embodiment.

FIG. 1 is a block diagram that illustrates the components of the multi-modal magnification system, in one embodiment. The multi-modal magnification system 100 includes at least one input device 110, an input detection component 120, a location identification component 130, a mode selection component 140, a panning component 150, a forwarding component 160, a magnification component 170, a display 180, and a configuration component 190. Each of these components is described in further detail herein.

The input device 110 receives input from a user and communicates the input to an operating system. The input device can be a variety of devices such as a stylus, digital pen, mouse, or even the user's finger moving over a touch screen. When the system 100 receives a mouse message (e.g., WM_LBUTTONDOWN), it may call the Win32 Application Programming Interface (API) called GetMessageExtraInfo to evaluate whether the message originated from a pen or a mouse device. The Win32 API provides a macro IsPenEvent that masks the value returned from GetMessageExtraInfo to determine the type of input received. If the macro returns true, then a pen or touch screen generated the message. Otherwise, a mouse device generated the message. The lower 8 bits returned from GetMessageExtraInfo are variable. Of those bits, the API uses seven to represent the cursor ID, zero for the mouse, or a variable value for the pen ID. Additionally, in Microsoft Windows Vista, the API uses the eighth bit to differentiate touch input from pen input (0=pen, 1=touch). In this way, the system 100 provides appropriate input paradigms for each type of input device.

The input detection component 120 converts the received input into coordinates of a displayed cursor. When a user moves the input device 110, the input detection component 120 moves the displayed cursor. The location identification component 130 identifies one or more user interface elements present at a current location of the displayed cursor. For example, the location identification component 130 may determine that the current location of the cursor is over a button that the user can press with the input device 110. As another example, the location identification component 130 may determine that the current location of the cursor is not over any user interface elements, such as when the cursor is over an empty portion of the desktop or a blank area of a document.

The mode selection component 140 selects between an interaction mode and a panning mode based on a user interface setting toggled by the user. The mode selection component 140 determines how the system will interpret subsequent actions of the user, and resolves the ambiguity of whether the user intends for an application or the multi-modal magnification system to receive gestures. For example, if the mode selection component 140 selects the interaction mode and the user inputs a touch gesture, then the system 100 forwards the gesture to the magnified application (or the operating system in the case of the desktop). If the mode selection component 140 selects the panning mode, then the system 100 interprets the touch gesture, such as dragging the input device 110 to a new location, as input to the magnifier window and updates the magnified area of the display accordingly.

The panning component 150 processes received input on behalf of the magnifier application. For example, if the received input is a touch-based gesture that indicates that the user wants to pan an area of the display that the multi-modal magnification system 100 is magnifying, then the panning component 150 pans the display. The panning component 150 stores the coordinates of the display area that the system is currently magnifying and modifies the coordinates based on movement of the input device 110 to pan the magnified area. The panning component 150 may apply scaling based on a magnification factor so that the user's movement within the magnified area does not pan the display faster than typically expected by the user. For example, if the magnification factor is set at 16 times magnification, then the mouse cursor on screen may appear to move much faster than the user would want to pan. The panning component 150 may handle other received user input, such as requests to zoom the magnified area in or out and requests to move the magnified view (i.e., lens) to a different location on the screen.

The forwarding component 160 passes received user input to the identified user interface elements when the mode selection component 140 selects the interaction mode. For example, the forwarding component 160 may pass along clicks of a mouse, taps of a stylus, or touch gestures to buttons or other user interface elements. The forwarding component 160 may pass these messages as standard messages familiar to the application, such as a mouse button down message (e.g., WM_LBUTTONDOWN on Microsoft Windows) or as a gesture message (e.g., ISG_TAP).

The display device 180 displays a graphical representation of one or more applications and a magnified view of at least a portion of the graphical representation. For example, the display 180 may display a desktop of the operating system and applications that are currently running as windows on the desktop. The user may select an area of the graphical representation that the system 100 will magnify by panning the magnified area. The magnification component 170 generates the magnified view from a selected area of the graphical representation. When the user pans the magnified area, the panning component 150 provides the coordinates of the new area to be magnified to the magnification component 170, and the magnification component 170 performs standard graphical operations, such as a stretch blit, to display a larger than usual view of the selected area.

The configuration component 190 receives configuration information from the user. For example, the user may turn off the interactive panning mode so that the mode selection component 140 does not do any panning, but rather allows the user to interact with an application in a traditional way. When the user turns the interactive panning mode back on, the mode selection component 140 behaves as described herein.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
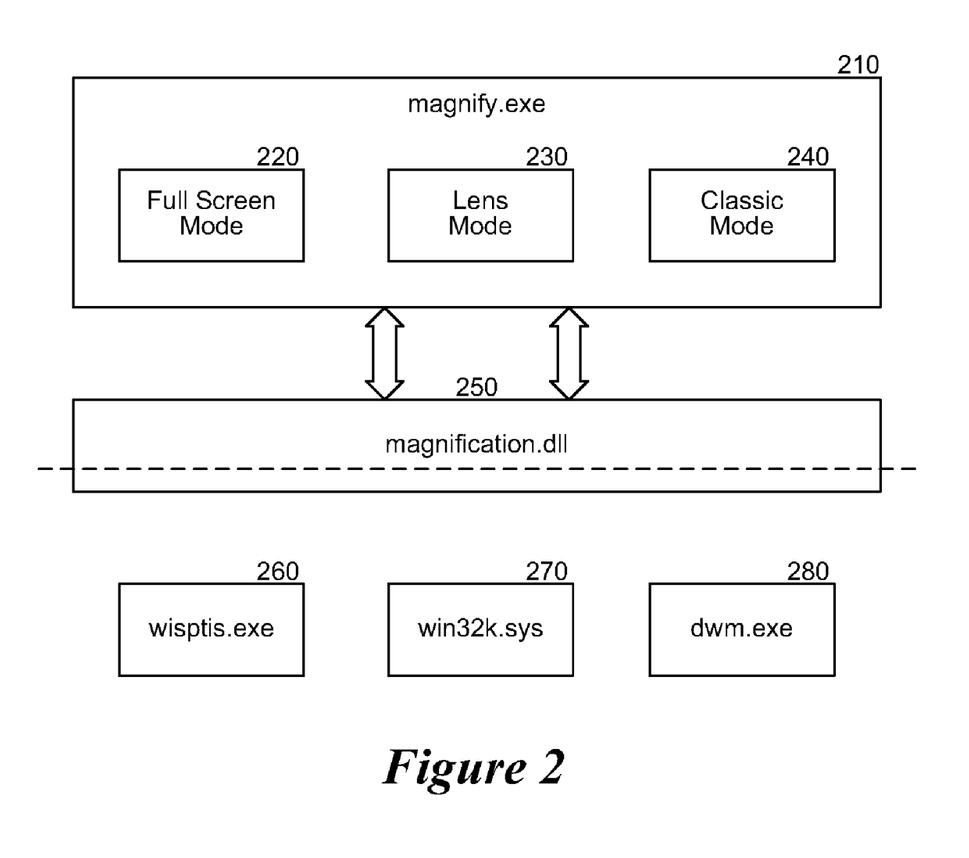
FIG. 2 is a block diagram that illustrates a Microsoft Windows-based operating environment of the multi-modal magnification system, in one embodiment.

FIG. 2 is a block diagram that illustrates a Microsoft Windows-based operating environment of the multi-modal magnification system, in one embodiment. The system includes an executable file 210, a supporting dynamic-link library 250, and three modules provided by the operating system, wisptis.exe 260, win32k.sys 270, and dwm.exe 280. The executable file 210, called magnify.exe, creates the process that controls the user interface and provides the end-to-end user experience. The magnifier.exe process controls the magnification, keeps track of input events, and moves the magnified view accordingly. The executable file 210 may provide three modes, full-screen mode 220, lens mode 230, and legacy mode 240. The full-screen mode 220 projects a magnified version of the user's desktop on the display device. One can picture it as a huge magnifier lens that covers the entire display. The lens mode 230 displays a magnified view of the desktop in a window that is smaller than the size of the display. This mode acts more like a traditional physical magnifying glass that a user can move around the desktop. The legacy mode 240 provides magnification with reduced functionality, such as when certain operating system services (e.g., dwm.exe) are not available. For example, during logon Microsoft Windows does not provide access to certain services to applications.

The dynamic-link library 250, magnification.dll, provides an application-programming interface (API) exposed to internal and external magnification controllers. The executable file 210 magnify.exe and other applications call this API to request various magnification services. The dynamic-link library 250 acts as a proxy between the magnification controller, the kernel-mode state for the magnification context, and the desktop compositor.

Win32k.sys 270 is a kernel-mode driver that handles the bulk of the Win32 API on Microsoft Windows. Win32k.sys 270 includes a Raw Input Thread (RIT) that handles input processing for the multi-modal magnification system. Win32k.sys 270 also handles security and context control. Dwm.exe 280 provides the DWM process that keeps track of application and other windows. Dwm.exe 280 handles the output compositing and magnification for the multi-modal magnification system. Wisptis.exe 260 is responsible for input to a tablet via a stylus or touch and consumes input transformation functions provided by Win32k.sys 270 to transform absolute clicking to work in magnified contexts (e.g., what you see is what you click).

Figure 3:
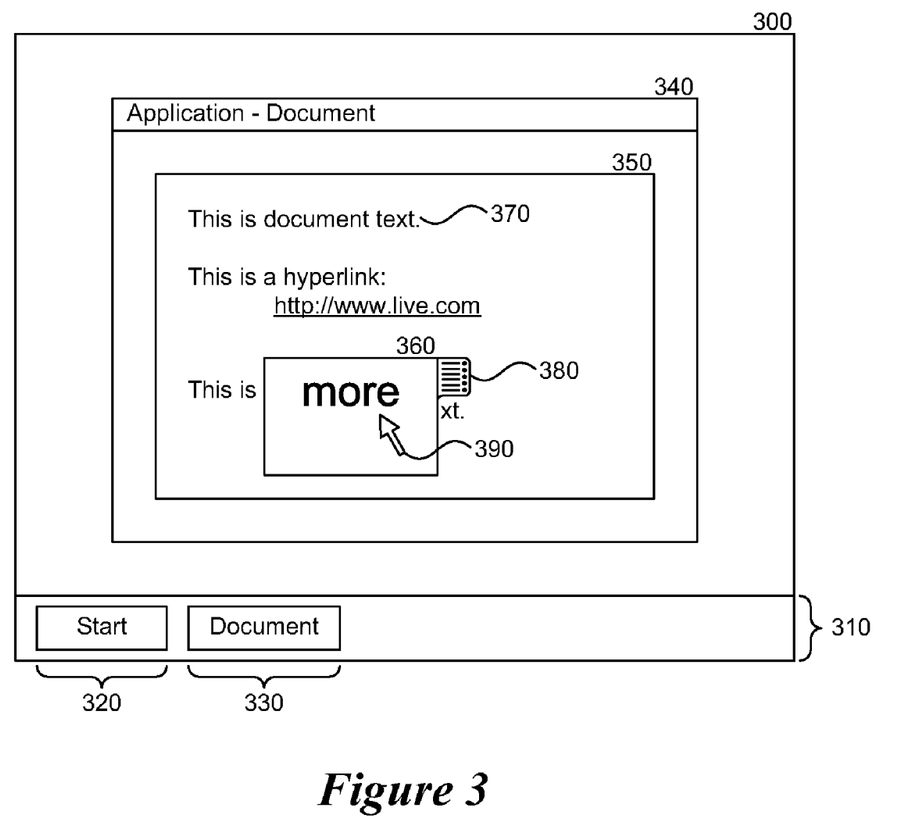
FIG. 3 is a display diagram that illustrates an operating environment of the multi-modal magnification system, in one embodiment.

FIG. 3 is a display diagram that illustrates an operating environment of the multi-modal magnification system, in one embodiment. The environment includes a typical desktop 300 that contains 1) a taskbar with an operating system menu 320 and a button 330 for activating one or more running applications, and 2) one or more application windows, such as application window 340. The application window 340 illustrates a typical document-based application (e.g., Microsoft Word or Microsoft Internet Explorer) that contains a document display area 350. The document display area 350 contains text 370 or other user interface elements that are meaningful to the application. The desktop 300 also includes a magnified view 360 that displays a portion of the desktop 300 or application window 340 at a larger than normal size. For example, the sentence under the magnified view 360 says, "This is more text," and the magnified view 360 shows a larger than normal display of the word "more." Note also that the magnified view 360 occludes portions of the application window 340 as described herein, such that the letters "te" of the word "text" are not visible. The magnified view 360 may contain a drag control 380 that the user can select with the cursor to move the magnified view 360 to a different area of the desktop 300 or application window 340. If the user clicks or touches the display while the cursor 390 is over the magnified view 360, the multi-modal magnification system will consume the input or pass the user's selection along to the user interface element displayed in the magnified view 360 based on the currently selected mode. For example, if the user clicks the word "more," and the system is in the interaction mode, then the application window 340 will receive the user's click.

Figure 4:
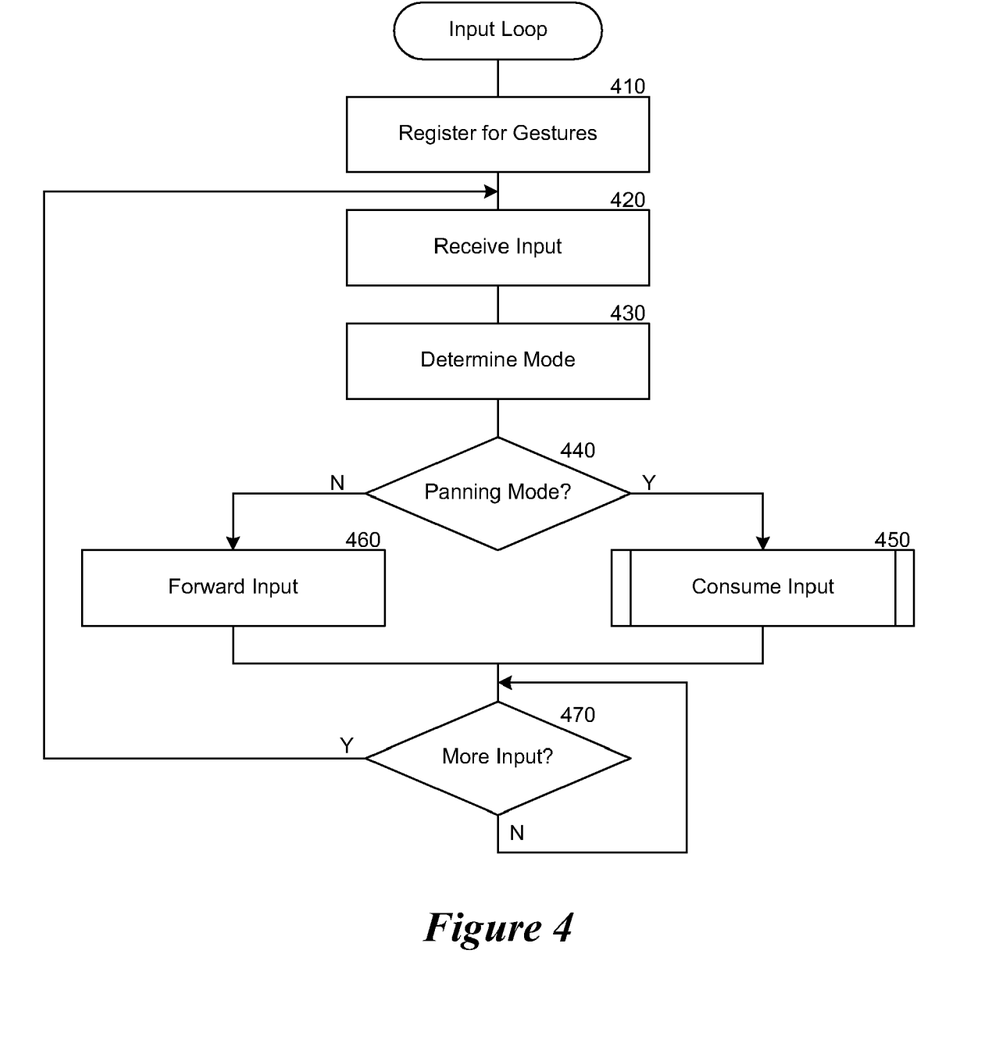
FIG. 4 is a flow diagram that illustrates the processing of components of the system for an input loop, in one embodiment.

FIG. 4 is a flow diagram that illustrates the processing of components of the system for an input loop, in one embodiment. In block 410, the system registers to receive gesture-based touch input. For example, the system may call an operating system API or provide a message handler that indicates that the magnifier application handles gesture-based input. In block 420, the system receives input from a user input device. For example, the system may receive a location of the desktop touched by a touch-based input device, such as a digital pen. In block 430, the system determines whether a panning mode is active. For example, the system may receive an explicit indication from the user (e.g., a toolbar toggle button) of which mode to use, or the system may automatically determine which mode to use (e.g., based on where the user clicked or a received special gesture).

In decision block 440, if the system is in the panning mode, then the system continues at block 450, else the system continues at block 460. In block 450, the system consumes the user input and does not pass it along to the underlying application or desktop, as described further with reference to FIG. 5. For example, if the system is in the panning mode and the user pinches a touch display, then the system zooms the magnified view (e.g., by modifying a magnification factor). In block 460, the system forwards the input to the underlying application or desktop. For example, if the user clicked on a button, then the system forwards the click to the button for processing. In decision block 470, if the system receives more input, then the system loops to block 420 to process the input, else the system loops to block 470 to wait for more input. After block 470, these steps conclude.

Figure 5:
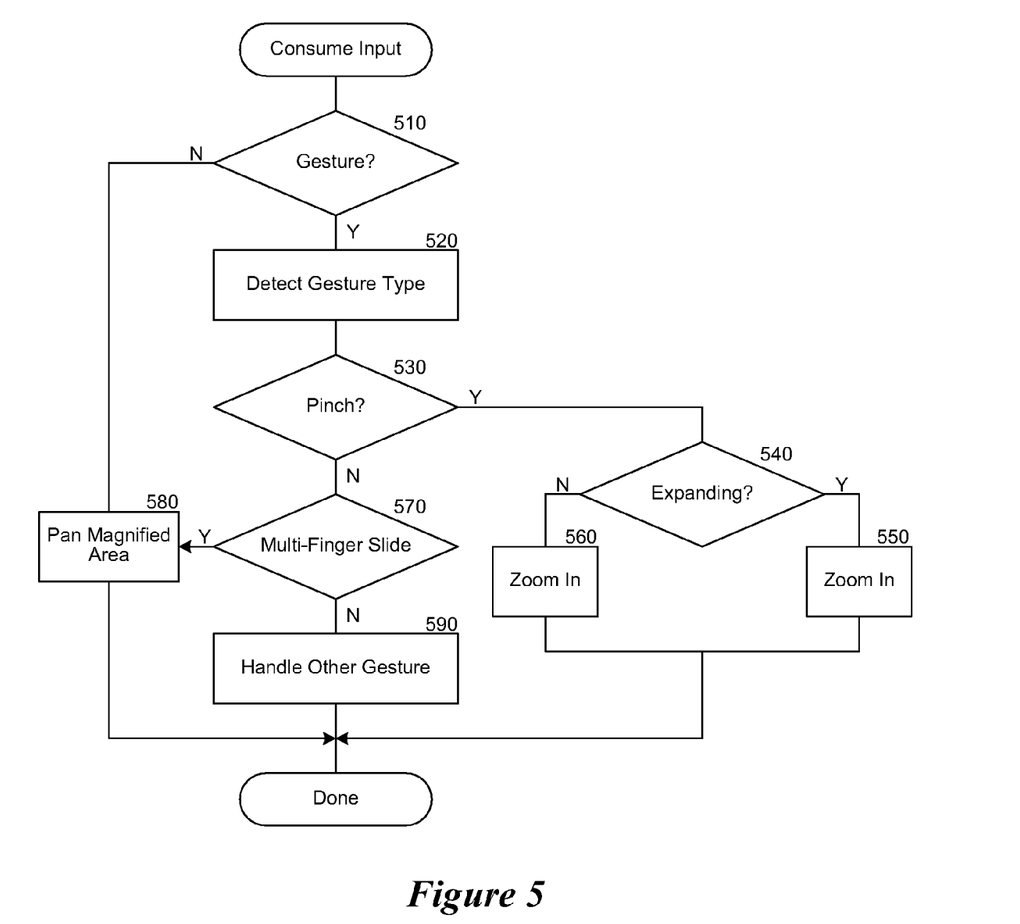
FIG. 5 is a flow diagram that illustrates the processing of the system to consume input directed to the system, in one embodiment.

FIG. 5 is a flow diagram that illustrates the processing of the system to consume input directed to the system, in one embodiment. These steps are invoked when the system determines that the user intends for the system to consume received input rather than an application magnified by the system. In decision block 510, if the received input is a touch-based gesture, then the system continues at block 520, else the system continues at block 580. In block 520, the system detects a type of the gesture. For example, the gesture may be a pinch or two-finger slide performed by the user. In decision block 530, if the gesture is a pinch, then the system continues at block 540, else the system continues at block 570. In decision block 540, if the pinch was an expanding pinch, then the system continues at block 550, else if the pinch was a contracting pinch the system continues at block 560. In block 550, the system zooms out of the magnified area. In block 560, the system zooms into the magnified area.

In block 570, if the gesture is a multi-finger slide, then the system continues at block 580, else the system continues at block 590. In block 580, the system pans the magnified area. In block 590, the system handles other gestures. For example, if the gesture is unrecognized, then the system may ignore the gesture or display an error indication to the user. The system may provide dedicated input handling for each particular mode of input. For example, if there is something that is more natural with a pen that the user cannot as easily do with the mouse, then the system may process pen input in a dedicated manner similar to that shown for touch-based gesture input. After block 590, these steps conclude.

In some embodiments, the multi-modal magnification system stores configuration information that a user can modify to alter the behavior of the system. For example, the user may be able to select the conditions under which the system switches modes (e.g., always in panning mode, or always consume gestures). As another example, the user may be able to configure the gestures to which the system responds by default. The system may also allow the user to turn off dedicated handling for a particular type of input, such as touch input, so that the type of input responds as other types of input.

Figure 6:
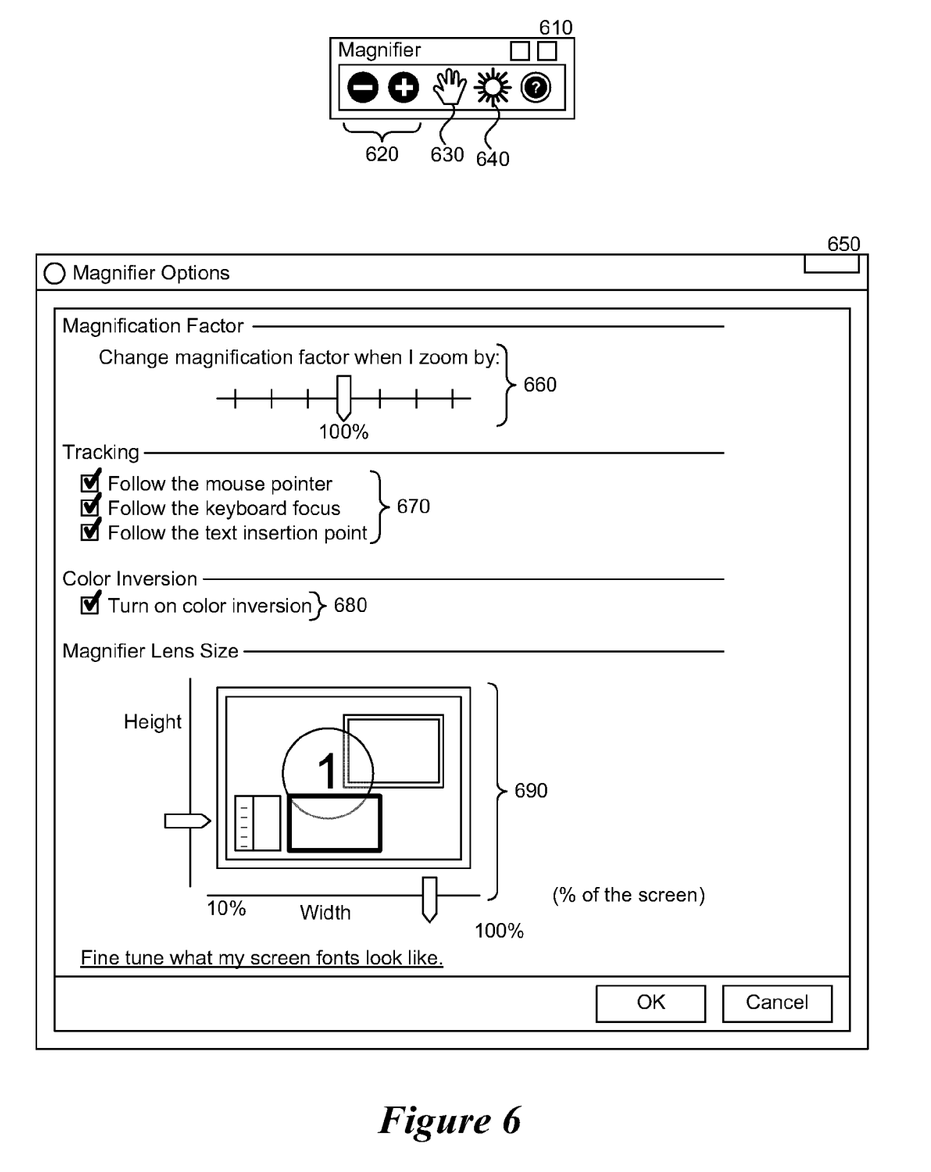
FIG. 6 is a display diagram that illustrates displays produced by the multi-model magnification system for receiving configuration information from a user, in one embodiment.

FIG. 6 is a display diagram that illustrates displays produced by the multi-model magnification system for receiving configuration information from a user, in one embodiment. The display 610 is a toolbar that the system may display when the system is currently magnifying a portion of the screen. The toolbar may appear only in the lens mode or in other modes as well (e.g., full screen). The toolbar contains buttons 620 for changing the magnification level (i.e., zooming in or out), a button 630 for switching between panning and interactive mode, and an options button 640 for displaying the configuration dialog box 650. The configuration dialog box 650 contains more extensive configuration options. The configuration dialog box 650 includes a similar control 660 for changing the magnification level, as well as options 670 for changing how the magnified view behaves (e.g., focus following, cursor following), an option 680 for inverting colors (e.g., a useful visual aid for vision-impaired users), and controls 690 for setting the size of the magnified view lens.

In some embodiments, an application is unaware of the multi-modal magnification system's actions to pan or forward along user input information. For example, when the system determines that the user wants to pan, the system may pass the application a standard drag message or not inform the application at all. On the other hand, when the system determines that the user wants to interact with an element of the application, then the system may forward a message, such as a standard mouse button down message, to the application that looks to the application like a standard mouse click. In this way, the application receives familiar indications, such as mouse clicks, of the user's actions and is unaware that the multi-modal magnification system is intercepting messages and providing additional or modified functionality before the messages reach the application.

In some embodiment, the multi-modal magnification system may display a special cursor to indicate the current mode to the user, so that the system informs the user about how the system will process input. For example, the system may display the common panning hand or another icon when the system is in the panning mode and a standard mouse cursor when the user is in the interaction mode. When the user makes a panning gesture, the system may show a gripping panning hand to convey to the user that the user has grabbed the magnified view's contents and can move the contents by moving the input device in a particular direction. When the system is in the interaction mode, the system displays whatever cursor the application or operating system has requested to display, such as the common arrow or a text insertion cursor.

In some embodiments, the multi-modal magnification system accelerates and decelerates the movement of the magnified view. For example, if a user requests panning and swings the pen in one direction, the magnified view may continue moving in that direction once the user lifts the pen from the screen's surface and then slowly roll while decelerating to a complete stop. The system takes the speed at which the pen leaves the screen and the total length of the dragging motion into consideration when determining the length and time of the continued rolling—or if rolling will occur at all. In some embodiments, the system calculates the speed used to determine rolling as 0.6 times the speed between the last two points plus 0.4 times the previous speed. Thus, the system considers previous points, but weights the most recent points more heavily. In some embodiments, if the user performs the panning motion below a certain velocity, rolling will not occur. For example, if the speed of pan motion is 100 pixels per second or less, rolling will not result when the user lifts the pen. Note that the length of the user's stroke may not matter whereas the speed of the stroke affects the speed and distance the page rolls once the user lifts the pen or other input device. The system may cap the total rolling time to a certain value (e.g., 500 ms).

From the foregoing, it will be appreciated that specific embodiments of the multi-modal magnification system have been described herein for purposes of illustration, but that various modifications may be made without deviating from the spirit and scope of the invention. For example, although a screen magnifier is described, application authors can use the techniques described herein for multi-modal input in other types of applications, such as an Internet browser. Accordingly, the invention is not limited except as by the appended claims.

We claim:
1. A computer-implemented method for responding to multiple modes of user input in a screen magnifier application, the method comprising:
   receiving input from one or more input devices, wherein the input devices comprise multiple modes of user input;

determining whether the received input is a touch-based gesture, wherein a touch-based gesture is a gesture produced by a user touching at least two fingers to an input device;
if the received input is a touch-based gesture,
detecting a type of the gesture, and
modifying a magnified area based on the detected type of the gesture; and
if the received input is not a touch-based gesture, modifying the magnified area based on the received input, wherein the screen magnifier application and a magnified application for which the screen magnifier application provides a magnified view are separate applications that run on top of an operation system.

2. The method of claim 1 wherein, when the detected type of the gesture is a pinch, modifying the magnified area comprises zooming in or out of the magnified area based on whether the pinch gesture was an expanding or contracting pinch gesture.

3. The method of claim 1 wherein, when the detected type of the gesture is a multi-finger slide, modifying the magnified area comprises panning contents of the magnified area based on a direction of the slide.

4. The method of claim 1 wherein the multiple modes comprise at least mouse input, keyboard input, and touch input.

5. A computer system for handling input associated with a magnifier application, the system comprising:
an input device configured to receive input from a user and communicate the input to an operating system;
an input detection component configured to convert the received input into coordinates of a displayed cursor, wherein when a user moves the input device, the input detection component moves the displayed cursor;
a location identification component configured to identify one or more user interface elements present at a current location of the displayed cursor;
a mode selection component configured to select between a panning mode in which the magnifier application consumes received input or an interaction mode in which the magnifier application forwards the received input to a magnified application;
a display device configured to display a graphical representation of one or more applications and a magnified view of at least a portion of the graphical representation; and
a magnification component configured to generate the magnified view from a selected area of the graphical representation.

6. The system of claim 5 wherein the input device component comprises a touch screen that receives a location of the screen that the user touches and gestures that describe a type of touch at the received location.

7. The system of claim 5 wherein the input detection component invokes an operating system API to determine a type of device that generated the received input.

8. The system of claim 5 wherein the mode selection component further comprises: a panning component configured to consume received input and modify behavior of the magnifier application, and a forwarding component configured to pass received user input to the magnified application.

9. The system of claim 8 wherein the forwarding component forwards messages to the magnified application in a way that the magnified application is not aware that the system received and forwarded the user input.

10. The system of claim 5 wherein the magnification component receives a bitmap of the selected area and performs a stretch blit to display a larger than usual view of the selected area in the magnified view.

11. The system of claim 5 further comprising a configuration component configured to receive configuration information from the user, and wherein the mode selection component is further configured to access the configuration information to determine which mode to select.

12. A computer-readable storage device encoded with instructions for controlling a computer system to process input when a screen magnifier that displays magnified contents of a screen of the computer system is running, by a method comprising:
registering to receive gesture-based touch input;
receiving input from a user input device, wherein the input indicates a location selected by the user;
determining whether a user has indicated for the screen magnifier to consume received input or whether the user has indicated for the screen magnifier to forward received input to a magnified application, wherein the screen magnifier and the magnified application are separate applications running on an operating system of the computer system;
if the user has indicated for the screen magnifier to consume received input, processing the received user input within the screen magnifier to modify the behavior of the screen magnifier; and
if the user has indicated for the screen magnifier to forward received input to the magnified application, forwarding the received input to the magnified application.

13. The device of claim 12 wherein registering to receive gesture-based touch input comprises calling an operating system API to indicate that the screen magnifier handles gesture-based touch input.

14. The device of claim 12 wherein the magnified application comprises an operating system desktop that is in the magnified contents.

15. The device of claim 12 wherein determining whether a user has indicated for the screen magnifier to consume received input comprises detecting a state of a toggled user interface setting.

16. The device of claim 12 wherein determining whether a user has indicated for the screen magnifier to consume received input comprises automatically determining a mode to use based on the received user input.

17. The device of claim 12 wherein processing the received user input within the screen magnifier comprises intercepting the received user input and not passing the received user input to the magnified application.

18. The device of claim 12 wherein when the received user input is a pinch gesture and the user has indicated for the screen magnifier to consume received input, processing the received user input within the screen magnifier comprises zooming the magnified contents in or out based on the received input.

19. The device of claim 12 wherein when the received user input is a slide gesture and the user has indicated for the screen magnifier to consume received input, processing the received user input within the screen magnifier comprises panning the magnified contents based on the received input.

20. The device of claim 12 further comprising, if the user has indicated for the screen magnifier to consume received input, modifying a displayed cursor to indicate that the screen magnifier will consume received input.

* * * * *

UNITED STATES PATENT AND TRADEMARK OFFICE
CERTIFICATE OF CORRECTION

| | | |
|---|---|---|
| PATENT NO. | : 8,176,438 B2 | Page 1 of 1 |
| APPLICATION NO. | : 12/238464 | |
| DATED | : May 8, 2012 | |
| INVENTOR(S) | : Nazia Zaman et al. | |

It is certified that error appears in the above-identified patent and that said Letters Patent is hereby corrected as shown below:

In column 9, line 15, in Claim 1, delete "operation" and insert -- operating --, therefor.

Signed and Sealed this
First Day of January, 2013

David J. Kappos
*Director of the United States Patent and Trademark Office*